United States Patent
Kawashima

[11] Patent Number: 5,204,950
[45] Date of Patent: Apr. 20, 1993

[54] DATA PROCESSING SYSTEM FOR TRANSMITTING DATA BETWEEN A HOST PROCESSOR AND AN I/O DEVICE

[75] Inventor: Kenichi Kawashima, Tokyo, Japan

[73] Assignee: International Business Machines Corporation, Armonk, N.Y.

[21] Appl. No.: 619,788

[22] Filed: Nov. 28, 1990

[30] Foreign Application Priority Data

Dec. 8, 1989 [JP] Japan .................................. 1-317910

[51] Int. Cl.⁵ ............................................. G06F 13/00
[52] U.S. Cl. ..................................... 395/200; 395/275
[58] Field of Search ................. 364/DIG. 1, DIG. 2; 395/200, 275, 325, 375, 425, 500, 725, 800

[56] References Cited

U.S. PATENT DOCUMENTS 4,015,243 3/1977 Kurpanek et al. .................. 395/325

Primary Examiner—Robert L. Richardson
Attorney, Agent, or Firm—Floyd A. Gonzalez

[57] ABSTRACT

A data processing system having a host unit generating a command and address, a local channel control device which is connectable to the host unit for receiving the command and the address, a remote channel control device, and a control unit connected to the remote channel control device. The local channel control device generates an initial status responsive to the command and address from the host unit, and sends the initial status to the host unit. The remote channel control device and the control unit likewise receive the command and address, and the control unit controls an I/O device responsive and the command and address. The host unit responds to the initial status to control the connection and disconnection between the local channel control device and the host unit. Connection and disconnection between the remote channel control device and the control unit can also be controlled.

8 Claims, 11 Drawing Sheets

| INITIAL STATUS TABLE 31 | | READ | WRITE | CONTROL | |
|---|---|---|---|---|---|
| | | COMMAND | | | |
| ADDRESS X '61' (CONTROL UNIT 5) | | X '4A' | X '00' | X '41' | |
| ADDRESS X '62' (CONTROL UNIT 4) | | X '4A' | X '00' | X '4A' | |

ADDRESS

FIG. 4A

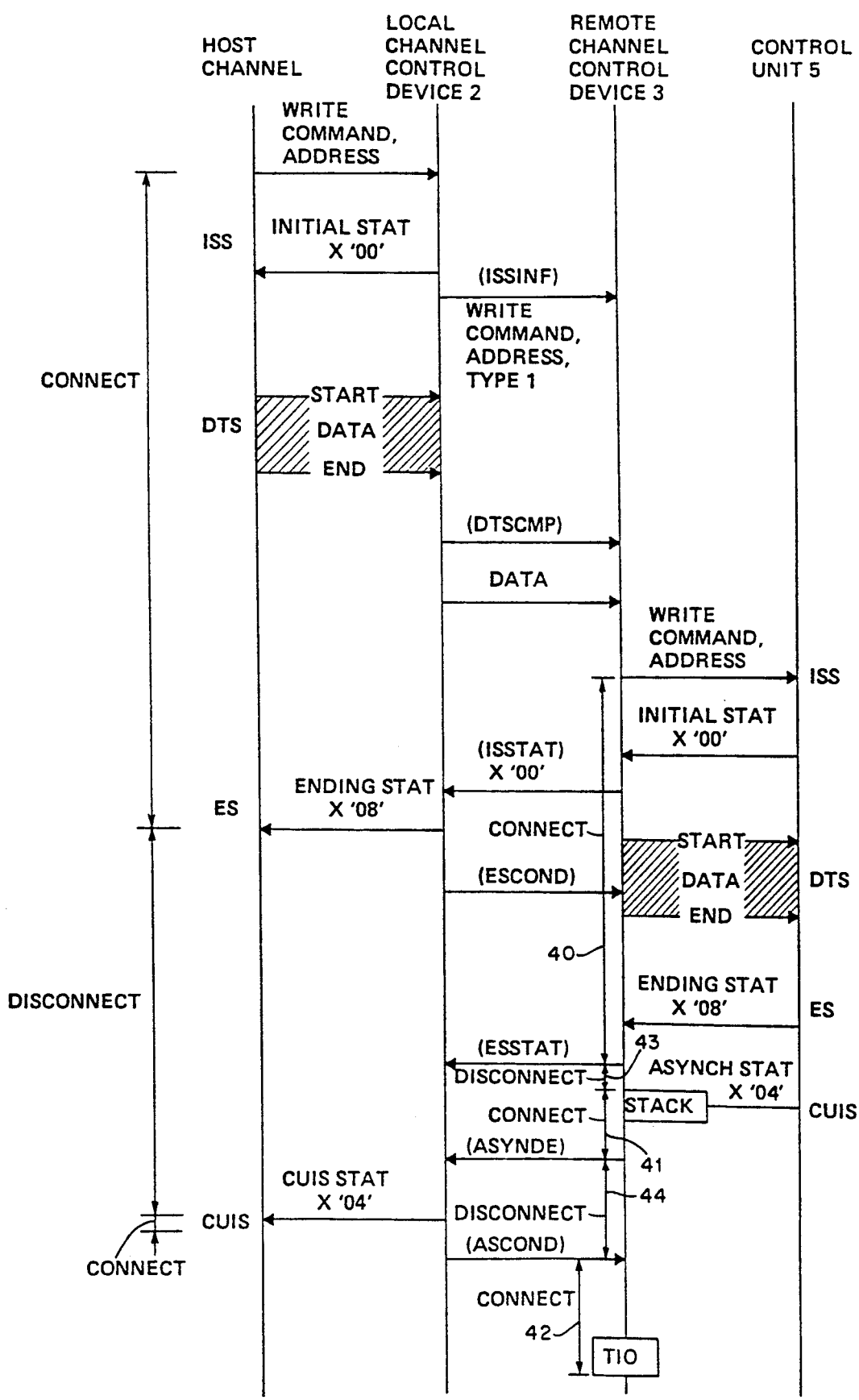
FIG. 5 TYPE 1 WRITE OPERATION

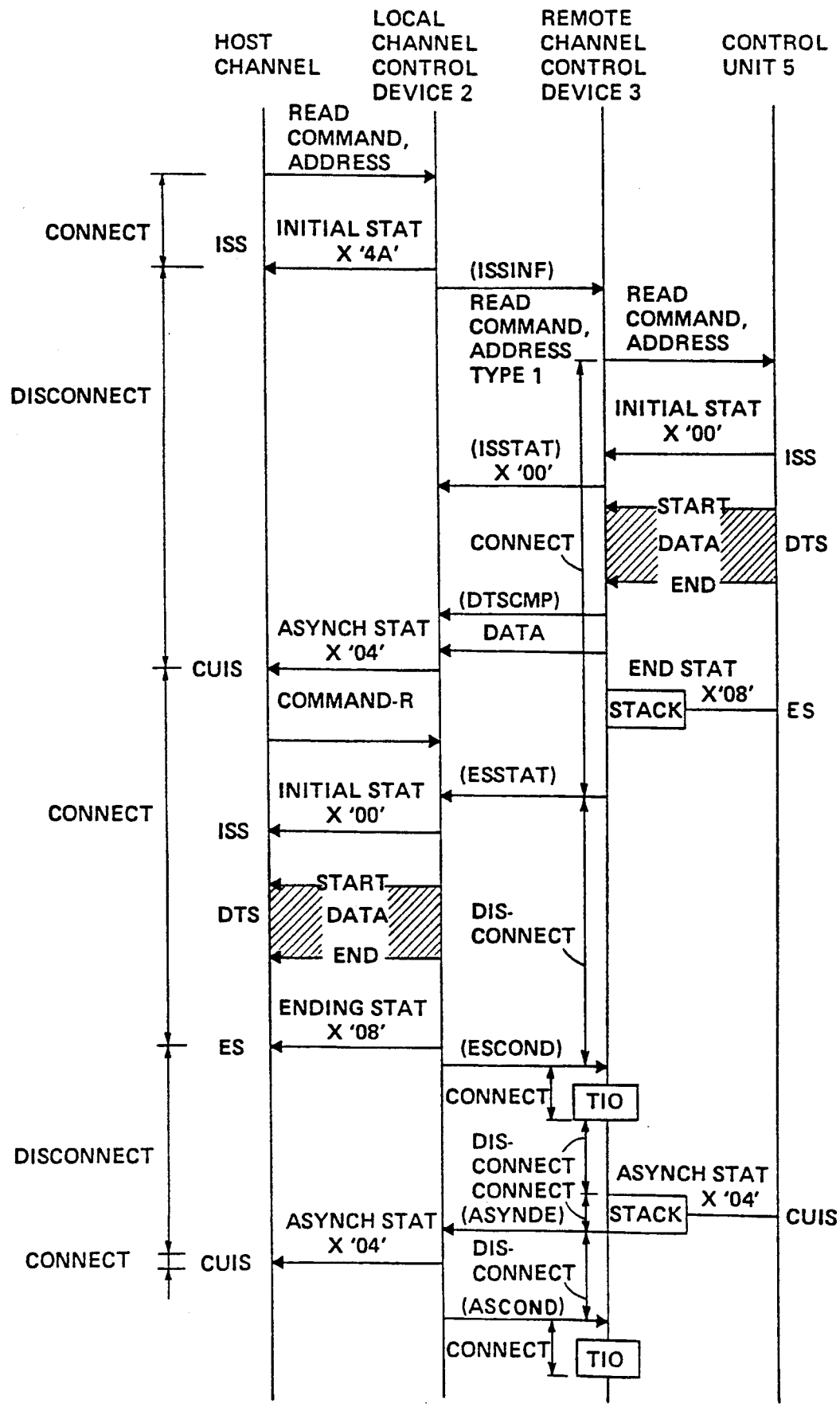
FIG. 6 TYPE 1 READ OPERATION

TYPE 2 WRITE OPERATION

TYPE 2 READ OPERATION

TYPE 3 OPERATION

DATA PROCESSING SYSTEM FOR TRANSMITTING DATA BETWEEN A HOST PROCESSOR AND AN I/O DEVICE

BACKGROUND OF THE INVENTION

1. Field of invention

The invention relates to a data processing system wherein a host unit is effectively connected or disconnected during the execution of a command depending upon the command and address.

2. Description of Related Art

FIGS. 10, 11 and 12 show prior technologies. FIG. 10 shows a standard connection between a host unit 131 and plural input/output (I/O) devices 141, 143 and 145. Plural control units 133, 135 and 137 are serially connected to the host unit 131, and a terminator (T) 139 is connected to the control unit 137. The I/O device is connected to each control unit. Lines 132, 134, 136 and 138 are parallel data busses. The host unit 131 includes a host processor, an operating system and a host channel. The host channel decodes a channel command word (CCW) from the host processor to supply a command and I/O device address to the control units connected in series. The control unit decodes the command to control the addressed I/O device. These operations have been called channel operations, and are well known in the art. One of the conditions required for the channel operation is that a response period in an initial sequence, from the time at which the host unit sends the command and the I/O device address to the time at which the control unit returns the response, must be shorter than a predetermined time period, such as 32 micro seconds. If none of the control units is assigned the I/O device address sent from the host channel, the command and the I/O device address are sent to the terminator (T) 139 and returned to the host channel. This must be done in a time period shorter than 32 micro seconds. If the response time is longer than 32 micro seconds, the initial selection sequence is deemed as an error, and the channel operation can not proceed. Therefore, the total length of the lines 132, 134, 136 and 138 has been selected to satisfy the above condition. In the past, the length has been limited to about 400 feet. However, in many instances, it is required to locate the control unit at a remote location over the 400 feet length limit. To solve this problem, the systems shown in the FIGS. 11 and 12 have been proposed. In the FIG. 11, the host unit 146 and a channel-to-channel adapter 147 are located at a local location, and the channel-to-channel adapter 149, the host unit 150, the control unit 151 and the I/O device 152 are located at a remote location, and a long transmission line 148 connects them. This approach locates the control unit 151 at the remote location, but requires the additional host unit 150 and an operator for operating it. This system has been installed in customer locations, but has the disadvantage of increasing of total cost due to the mentioned additional host unit 150 and the operator.

FIG. 12 shows a system disclosed in Japanese patent 1411818 wherein a channel adapter 155 and I/O adapter 157 are connected between the host unit 153 and the I/O device 159. Lines 154 and 158 are parallel data transmission lines and line 156 is a serial data transmission line. The channel adapter 155 and the I/O adapter 157 operate as buffers between the host unit 153 and the I/O device 159. In the configuration of FIG. 12, the connection between the host unit 153 and the channel adapter 155 is maintained during the process of the command, so that other jobs of the host unit must wait for the completion of the command.

SUMMARY OF THE INVENTION

The object of the present invention is to provide a data processing system solving the problems of the prior technologies.

The data processing system in accordance with the present invention comprises:
- a host unit generating a command and address:
- a local channel control means connectable to the host unit for receiving the command and the address, and for generating an initial status responsive to the command and the address to send an initial status to the host unit;
- a remote channel control means connected to the local channel control means for receiving the command and the address; and
- a control unit connected to the remote channel control means for receiving the command and the address for controlling an I/O device;
- wherein the host unit responds to the initial status to control a connection and a disconnection between the local channel control means and the host unit.

The local channel control means determines the type of operation for processing the command, in accordance with the command and the address, and sends a type information representing the type of operation to the remote channel control means. The remote channel control means responds to the type information to control the I/O device.

The local channel control means includes an initial status table storing initial statuses which are accessed by the command and the address, and a type information table storing type information, the type information table being accessed by the command and the address.

The control unit may be either a control unit without a data buffer memory or a control unit with a data buffer memory.

The host unit and the local channel control means are connected by a parallel data transmission line, the local channel control means and the remote channel control means are connected by a serial data transmission line, and the remote channel control means and the control unit are connected by a parallel data transmission line.

The data processing system in accordance with the present invention comprises:
- a host unit generating a WRITE command and an address;
- a local channel control means connectable to the host unit for receiving the WRITE command, the address and data;
- a remote channel control means connected to the local channel control means for receiving the WRITE command, the address and the data; and
- a control unit connectable to the remote channel control means for receiving the WRITE command, the address and the data and for sending an initial status representing an acceptance of the WRITE command to the remote channel control means;
- wherein the remote channel control means sends the WRITE command to the control unit after receiving the data from the local channel control means, and sends the initial status of the control unit to the local channel control means;

the local channel control means responds to the initial status to send a channel end status to the host unit; and the host unit responds to the channel end status to disconnect the local channel control means from the host unit until receiving a device end status from the local channel control means.

The data processing system in accordance with the present invention comprises:

a host unit generating a READ command and an address;

a local channel control means connectable to the host unit for receiving the READ command and the address;

a remote channel control means connected to the local channel control means for receiving the READ command and the address; and a control means connectable to the remote channel control means for receiving the READ command and the address, and connected to an I/O device for receiving data from the I/O device;

the local channel control means responds to the READ command and the address to send a first status representing a command retry to the host unit, receives the data from the control unit through the remote channel control means, and sends a second status to the host unit representing the receipt of the data; and the host unit responds to the first status to disconnect the local channel control means from the host unit, and responds to the second status to connect the local channel control means to the host unit for receiving the data from the local channel control means.

The foregoing and other objects, features and advantages of the invention will be apparent from the following more particular description of the preferred embodiment of the invention as illustrated in the drawings.

BRIEF DESCRIPTION OF THE DRAWINGS

FIGS. 4A and 4B show the initial status table and the type information table in the local channel control device, respectively.

FIGS. 5, 6, 7, 8 and 9 show the operations performed in the data processing system in accordance with the present invention.

DESCRIPTION OF THE PREFERRED EMBODIMENT

Figure 1:
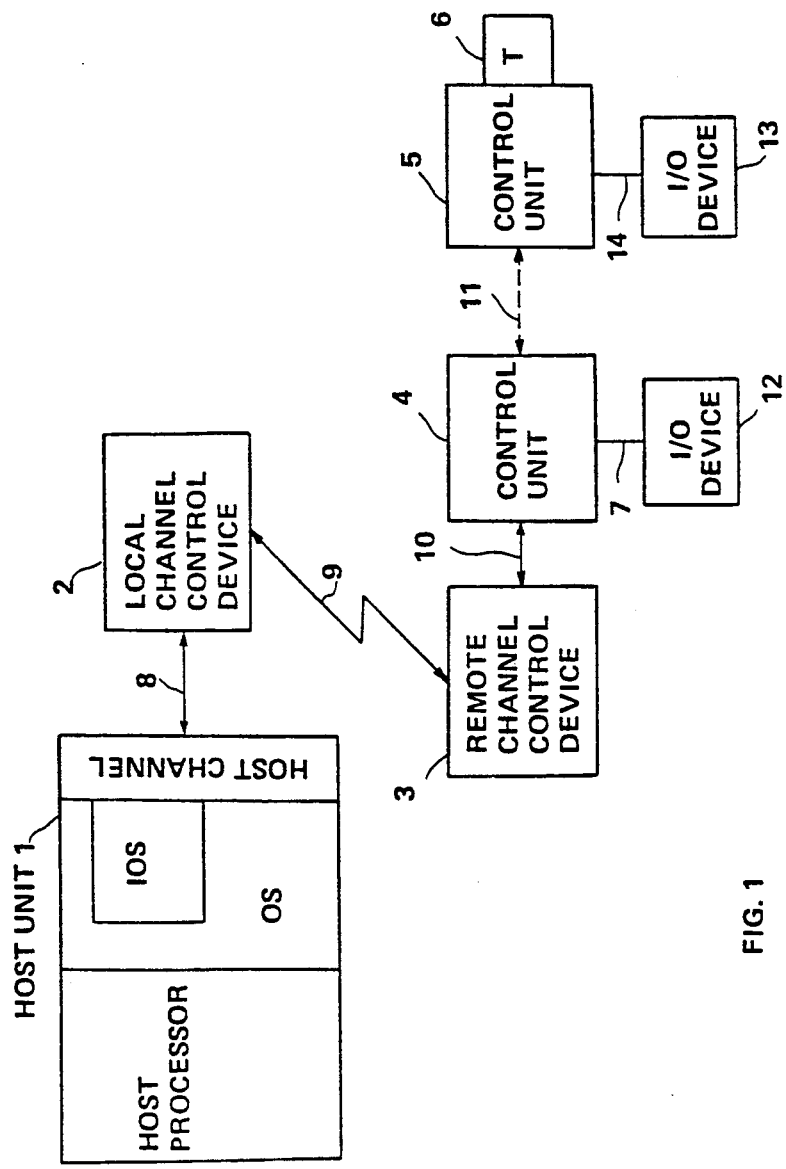
FIG. 1 shows a block diagram of the data processing system in accordance with the present invention.

FIG. 1 shows the data processing system in accordance with the present invention. The system includes a host unit 1, a local channel control device 2, a remote channel control device 3, control units 4 and 5 and I/O devices 12 and 13. The control unit 4 is provided with a data buffer memory (to be discussed), while the control unit 5 does not have a data buffer memory in the illustrated embodiment. Although additional control units may be serially connected to the remote channel control device 3, only control units 4 and 5 are shown in the FIG. 1 to illustrate the invention. The host unit 1 includes a host processor, an operating system (OS) which includes IO Supervisor (IOS), and a host channel. The OS and IOS decode channel control words (CCW) including command and address or data from the host processor to control the host channel, in a manner well known in the art. Line 8 is a parallel data transmission line including plural tag lines and two 9 bit buses, and the command, address, data and status information are transmitted in parallel between the host unit 1 and the local channel control device 2. Line 9 is a well known serial data transmission line, such as one of an RS449, V35, X21, HSDS, etc. Lines 10 and 11 are the same as the line 8, and, the command, the address, the data and the status information are transmitted in parallel between the remote channel control device 3 and the control unit 4. I/O devices 12 and 13 are connected to the control units 4 and 5 by lines 7 and 14, respectively. Examples of the tag lines in the lines 8, 10 and 11 are Service In, Service Out, Data In, Data Out, Command Out, Suppress Out, etc. Since these tag lines are well known in the art, details of the tag lines are not described.

Figure 2:
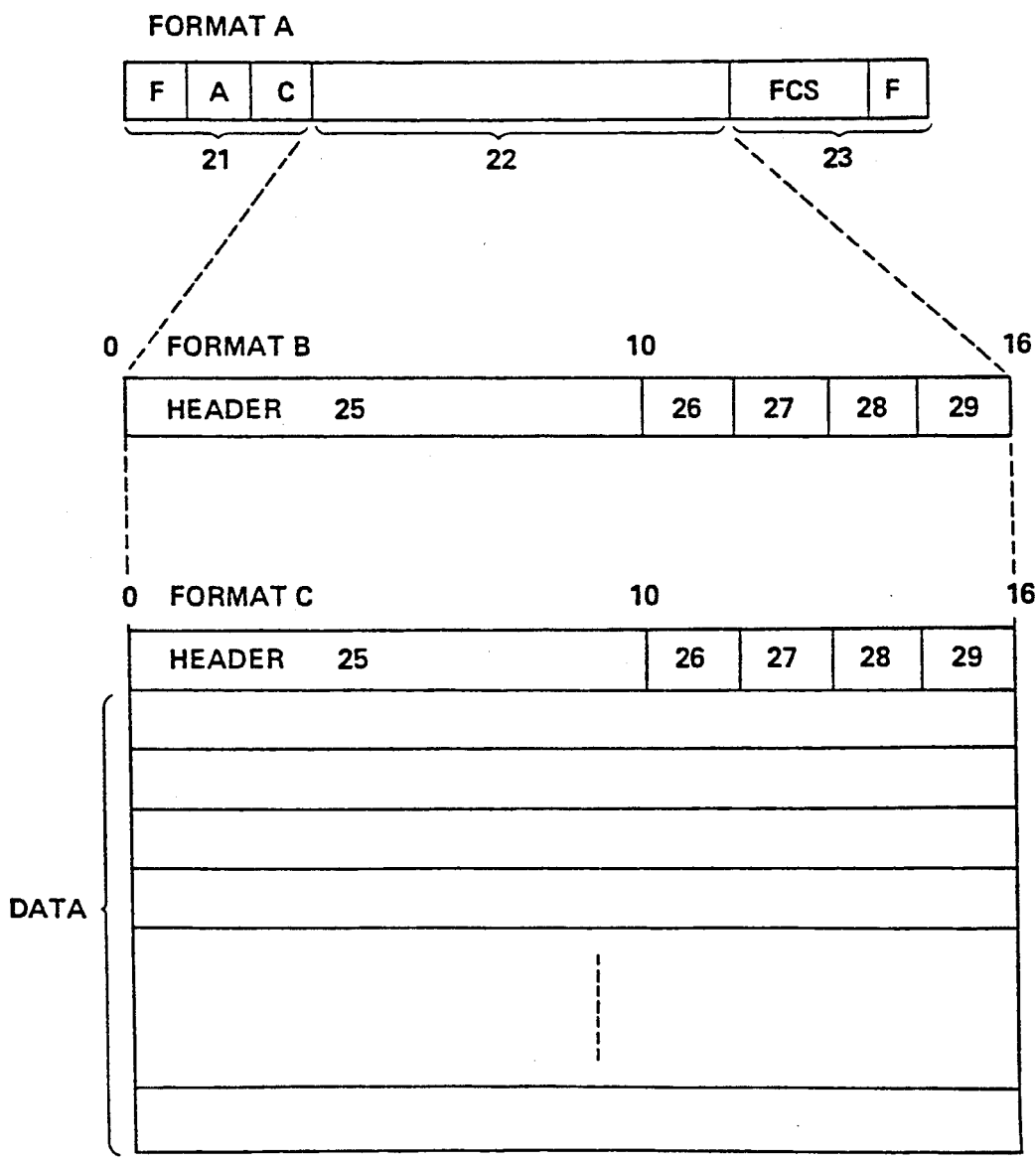
FIG. 2 shows the transmission formats used in the present invention.

FIG. 2 shows formats used in the serial transmission line 9 between the local channel control device 2 and the remote channel control device 3. Format A is used to perform the transmission of the data or the status information. A portion 21 of the format A includes flags (F), address (A) of the local or remote channel control device 2 or 3 and control data (C). A portion 22 is used to transmit format B or format C. A portion 23 includes frame check sequence (FCS) and flags (F). 16 byte format B is used to transmit various messages, to be described, between the local channel control device 2 and the remote channel control device 3. Header portion 25 includes the address of the control unit, length of the format B, information indicating data chaining, etc. Two byte portion 26 is used for message code. One byte portion 27 is used for the address. One byte portion 28 is used for the CCW command code. Two byte portion 29 is used for type information, Type 1, Type 2 or Type 3, as described hereinafter. Format C is used for transmitting data between the local channel control device 2 and the remote channel control device 3. The 16 bytes are followed by the data. Therefore, the format C includes the mentioned 16 bytes and the data.

In the present invention, the local channel control device 2 sends an initial status to the host channel depending upon the received command and address, to the host channel. To this end, the local channel control device 2 includes an initial status table 31 accessed by the command and the address, as stated hereinafter. The host channel responds to the initial status to control the connection and the disconnection of the local channel control device 2. The address used in the specification is defined as the address of the control unit when only one I/O device is connected to the control unit, or the addresses of both the control unit and I/O device when plural I/O devices are connected to the control unit.

The present invention also selects one of processing patterns or types of operations, depending on whether the addressed control unit is provided with a data buffer memory. In the illustrated embodiment, the control unit 4 is provided with a data buffer memory, and the control unit 5 is not provided with a data buffer memory. The control unit 4 can store the data in its own data buffer memory. Accordingly, the control unit 4, in the READ operation, can store the data sent from the I/O device. When a re-transmission of the data due to a transmission error, for example, is requested, the data is re-transmitted from the data buffer memory of the control unit 4 to the remote channel control device 3 without re-operating the I/O device. The control unit 4, in the WRITE operation, can store the data sent from the remote channel control device 3. When a re-transmission of data due to a printer error, for example, is requested, the data is re-sent from the data buffer memory of the control unit 4 to the printer without re-transmitting the data from the remote channel control device 3. Thus, the control unit 4 can recover the error without requesting the re-transmission of the data from the data source.

The control unit 5, lacking a data buffer memory, can not store and only passes the data. Accordingly, the control unit 5, in the READ operation, passes the data sent from the I/O device, such as a tape unit, to the remote channel control device 3. When the re-transmission of the data is required due to an error, the tape unit must be connected again and the data re-transmitted from the tape unit to the remote channel control device 3 through the control unit 5. The control unit 5, in the WRITE operation, also passes the data sent from the remote channel control device 3 to a printer, for example. When the re-transmission of the data is required, the data must be re-sent from the remote channel control device 3 to the printer through the control unit 5. Thus, control unit 5 requires the re-connection of the data source to recover an error.

The types of operations for processing the commands are classified into the following three type operations:

TYPE 1 Operation

The type 1 operation processes READ or WRITE commands to the control unit 5 without the data buffer memory. The type 1 operation processes a command which requires the data transfer sequence, X'00' as an initial status, X'08' as an ending status and X'04' as an asynchronous status.

The statuses used in the embodiment are as follows:
X'00'—Command normally accepted
X'04'—Device end
X'08'—Channel end
X'0C'—Channel end and Device end
X'4A'—Command retry The X'00' status represents that the command is accepted. When the host channel and the local and remote channel control devices receive an X'00' status, they can proceed to the next operation.

The X'08' (Channel end) status represents that the operations of the command on the channel have been completed without error, e.g. error in the number of data, parity error, etc. The X'08' status is sent responsive to the receipt of the X'00' status from the control unit, based upon the assumption that the data transfer will be completed without an error.

The X'04' (Device end) status represents that the control unit or the I/O device has received the data, and that the host channel can erase the data and process to the next command.

The X'4A' status makes the host channel perform the command retry responsive to the receipt of the X'04' status from the local channel control device 2.

TYPE 2 Operation

The type 2 operation is used for processing the READ or WRITE command to the control unit 4 with the data buffer memory. The commands require the data transfer sequence, require the X'00' status as the initial status, and require the X'0C' status as the ending status.

TYPE 3 Operation

In this operation, the data transfer sequence is not performed. The TYPE 3 operation processes the CONTROL command, which requires the X'08' status as the initial status, and requires the X'04' status as the asynchronous status. The type 3 operation processes CONTROL commands, such as SPACE, STOP, REWIND, which change a condition of the I/O device.

Figure 3:
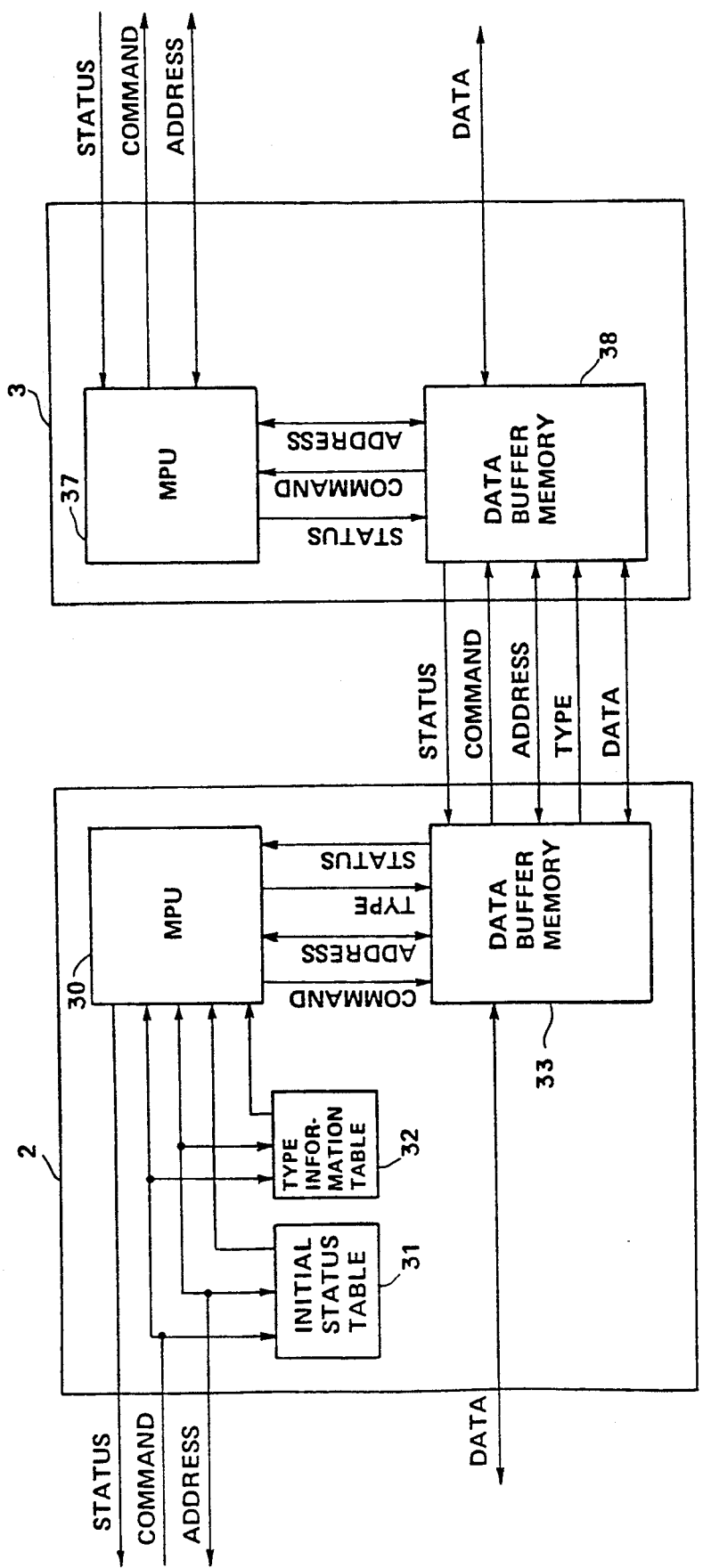
FIG. 3 shows the local channel control device and the remote channel control device.

FIG. 3 shows the details of the local channel control device 2 and the remote channel control device 3. The local channel control device 2 includes a microprocessor (MPU)30, an initial status table 31, a type information table 32 and a data buffer memory 33. The MPU 30 controls the operations and the data buffer memory 33 stores the data. The remote channel control device 3 includes an MPU 37 which controls the operations of the device 3 and a data buffer memory 38 which stores the data.

The MPU 30 in the local channel control device 2 receives the command and the address, sends a message which represents the command, the address and the type information to the remote channel control device 3, sends the status to the host channel, and controls the transmission of data.

The MPU 37 in the remote channel control device 3 responds to the message from the local channel control device 2 for controlling the control unit 4 or 5 and the transmission of data.

FIG. 4A shows the initial status table 31 which stores various initial statuses, one of which is fed back to the host channel in accordance with the command and the address of the control unit when these are supplied from the host channel to the local channel control device 2. One of the statuses is accessed by the command and the address. In other words, one of the initial statuses is selected depending upon the command and the address of the control unit.

Figure 4B:
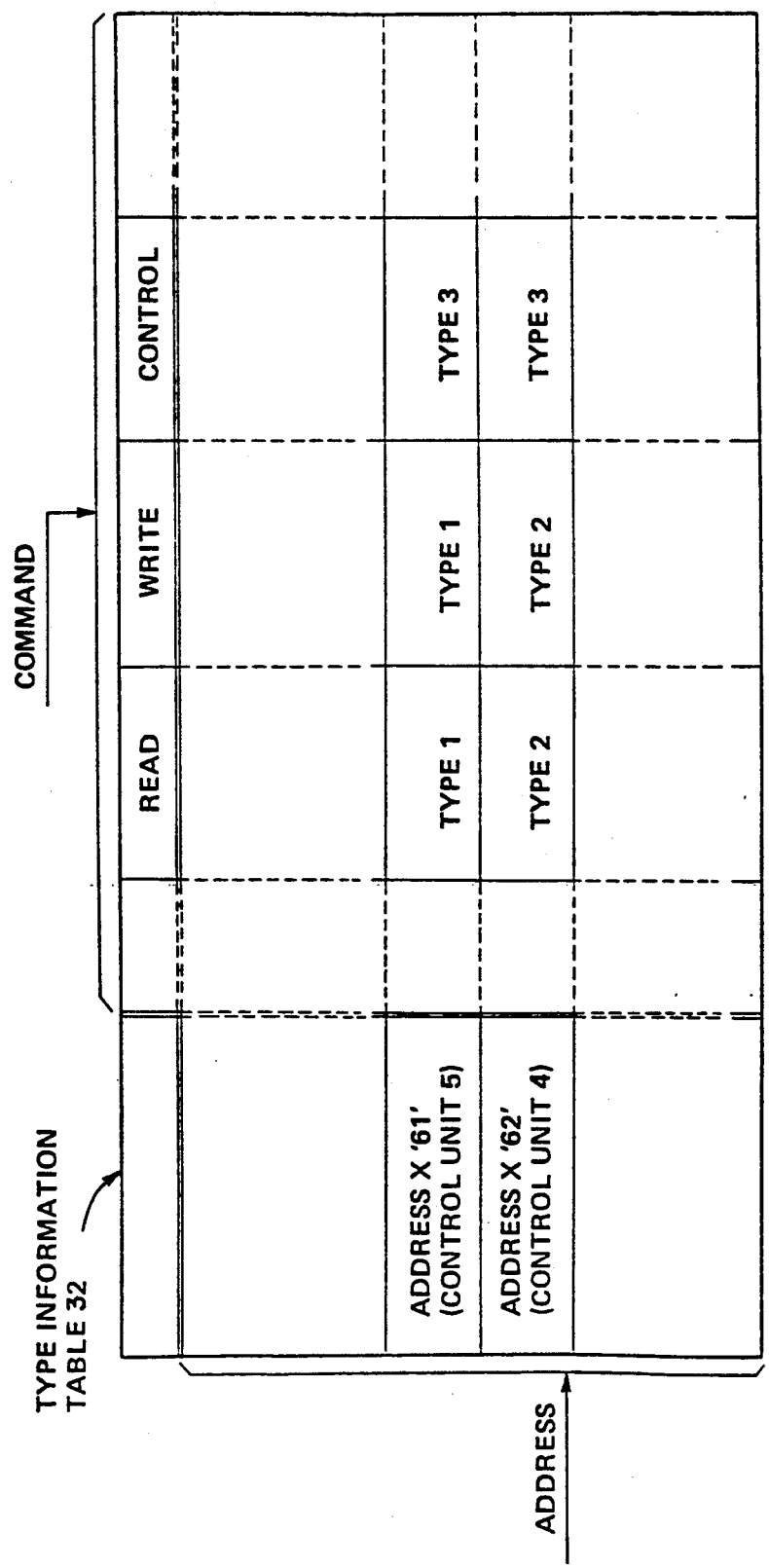

FIG. 4B shows the type information table 32 which stores the type information, i.e. Type 1, Type 2 and Type 3, one of which is selected depending upon the command and the address of the control unit supplied from the host channel to the local channel control device 2.

The local channel control device 2 decodes the command and the address supplied from the host channel to send back the initial status to the host channel, depending upon the received command and the address, and to send both the command and address along with the type information, i.e. Type 1, Type 2 or Type 3, which is selected depending upon the command and the address, to the remote channel control device 3.

FIGS. 5, 6, 7, 8 and 9 show various operations between the host channel and the local channel control device 2, between the local channel control device 2 and the remote channel control device 3, and between the remote channel control device 3 and one of the control units 4 or 5. In FIGS. 5 and 6, operations are illustrated using control unit 5, and in FIGS. 7, 8 and 9, operations are illustrated using control unit 4.

Operational sequences between the host channel and the local channel control device 2, and between the remote channel control device 3 and the control unit, are as follows:

ISS—Initial selection sequence

DTS—Data transfer sequence
ES—Ending status transfer sequence
CUIS—Control unit initiated sequence During the ISS, the command and the address are sent, and the initial status is sent back, either between the host channel and the local channel control device 2, or between the remote channel control device 3 and the control unit.

During the DTS, the data is sent either between the host channel and the local channel control device 2, or between the remote channel control device 3 and the control unit.

During the ES, the ending status is sent either between the host channel and the local channel control device 2, or between the remote channel control device 3 and the control unit.

During the CUIS, the asynchronous status is sent either between the host channel and the local channel control device 2, or between the remote channel control device 3 and the control unit.

In FIGS. 5-9, the operational sequences between the host channel and the local channel control device 2 are shown along the left side of the figures and are referred to herein as host channel sequences, and the operational sequences between the remote channel control device 3 and the control units 4 or 5 are shown along the right side of the figures and are referred to herein as control unit sequences.

Messages transmitted between the local channel control device 2 and the remote channel control device 3 are as follows:

ISSINF—Initial selection information. When the ISSINF is sent from the control device 2 to the control device 3, the command, the address and the type information are also sent from the control device 2 to the control device 3.

ISSTAT—Initial status sent from the control unit. When the ISSTAT is sent, the control unit address is also sent.

DTSCMP—Data transfer complete. When the control device 2 or 3 has received the data transfer, this message is sent along with the control unit address.

ESSTAT—Ending status. ESSTAT is used to transmit the ending status of the control unit. The control unit address is also sent.

ESCOND—Ending status condition. ESCOND indicates the response of the host channel when the host channel receives the ending status.

ASCOND—Asynchronous status condition. ASCOND indicates the response of the host channel when the host channel receives the asynchronous status.

ASYNDE—Asynchronous device end. ASYNDE is used to transmit the device end status to the local channel control device 2.

FIG. 5 shows the TYPE 1 WRITE operation wherein the data is sent from the host unit 1 to the control unit 5, which lacks a data buffer memory, and then to the I/O device 13.

During the host channel ISS, the host channel supplies the local channel control device 2 the WRITE command and the control unit address X'61' of the control unit 5. Referring to the FIGS. 3 and 4A, the WRITE command and the address X'61' are supplied to the initial status table 31, so that the initial status X'00' (Command normally accepted) is selected, and the local channel control device 2 sends the host channel the selected initial status X'00', as shown in the FIG. 5. The WRITE command and the address X'61' are also supplied to the information table 32 of the local channel control device 2, as shown in the FIGS. 3 and 4B, so that the type information, i.e. TYPE 1, is selected, and the local channel control device 2 sends the remote channel control device 3 the WRITE command, the address X'61' and the selected type information TYPE 1 with the ISSINF (Initial selection information). The host channel responds to the X'00' status by transmitting to the local channel control device 2, the data during the host channel DTS (Data transfer sequence). When the local channel control device 2 has received the data, the control device 2 sends to the remote channel control device 3, the message DTSCMP (Data transfer complete), and transmits the data to the remote channel control device 3. After receiving the data, the remote channel control device 3 sends the WRITE command and the address X'61' to the control unit 5 during the control unit ISS. The control unit 5 sends the initial status X'00' to the remote channel control device 3, which passes the X'00' status, along with the message ISSTAT, to the local channel control device 2 The control device 2 responds to the X'00' status by sending the ending status X'08' (Channel end) to the host channel during the host channel ES (Ending status transfer sequence). That is, the control device 2 sends the ending status X'08' when the remote channel control device 3 has received the data and the control unit 5 has sent the initial status X'00' to the local channel control device 2. It will be noted that the X'08' status is generated at the receipt of the X'00' status from the control unit 5 based upon the assumption that the data transfer will be completed without an error.

The host channel sends a signal representing the acceptance of the X'08' status on its Service Out tag line to the local channel control device 2. The local channel control device 2 then sends to the remote channel control device 3, the message ESCOND representing that the host channel has accepted the X'08' status. The host channel then disconnects the local channel control device 2, and is free to perform other jobs. After sending the ISSTAT X'00' status, the remote channel control device 3 sends the data to the control unit 5 during the control unit DTS. After receiving the data, the control unit 5 sends the ending status X'08' to the remote channel control device 3 during the control unit ES and, after sending the data to the I/O device 13, sends the asynchronous status X'04' during the control unit CUIS. The remote channel control device 3 stacks the X'04' status. The stack indicates that the remote channel control device 3 has not accepted the X'04' (Device end) status, but does know about the arrival of and can read the X'04' status. The X'04' status is stacked since, if the remote channel control device 3 did accept the X'04' status, the control unit 5 would understand that the operation of the WRITE command is complete and thus could not respond to a RESET, CHAINING, etc. command which would subsequently be sent from the host channel in this WRITE operation. The stack allows the control unit 5 to respond to any such later send RESET or CHAINING commands from the host channel.

The remote channel control device 3 sends ASYNDE (X'04') to the local channel control device 2, which sends a CUIS STAT X'04' to the host channel during the host channel CUIS. The host channel responds to the X'04' status by sending the control device 2 a signal on the Service Out tag line when it accepts the X'04' status, or sends either RESET or CHAINING on the respective tag lines to the control device 2, if these are required. The local channel control device 2 sends the ASCOND message to the remote channel control device 3, indicating the mentioned host channel response. When the host channel response is ACCEPT, the control device 3 then accepts the ASYN STAT X'04', and the WRITE operation is complete. When the host channel response is RESET, the RESET is sent to the control unit 5 for performing the RESET operation.

The above operations for processing the host channel response are performed by TEST I/O (TIO) shown in the FIG. 5, and also in FIGS. 6-9 in a similar manner.

In the type 1 operation, the control unit 5 sends the status X'08' to the remote channel control device 3 when the control unit 5 has passed the data to the I/O device 13 and sends the status X'04' to the remote channel control device 3 when the I/O device 13 has processed the data.

The statuses X'08' and X'04' are separately generated since the control unit 5 does not have a data buffer memory and can not generate the X'04' (Device end) status until the I/O device 13 has processed the data.

The host channel connects to the local channel control device 2 from the host channel ISS (Initial selection sequence) to the host channel ES (Ending status transfer sequence), disconnects from the control device 2 until the host channel CUIS (Control unit initiated sequence), and then connects again to the control device 2 during the host channel CUIS, as shown in the FIG. 5. The host channel, therefore, can perform other jobs during the disconnected period.

The remote channel control device 3 is connected to the control unit 5 during the connection periods 40, 41 and 42, and is disconnected from the control unit 5 during the disconnection periods 43 and 44, as shown in FIG. 5. The control device 3 can perform the job of the other control unit during the disconnected periods 43 and 44. The control unit 5 can connect again to send the ASYN STAT to the control device 3 during, for instance, 41 or 42.

FIG. 6 shows the TYPE 1 READ operation wherein the data is sent from the I/O device 13 via the control unit 5 to the host unit 1.

During the host channel ISS, the host channel sends to the local channel control device 2, the READ command and the address X'61' of the control unit 5. In the same manner stated in the TYPE 1 WRITE operation, the READ command and the address X'61' are supplied to the initial status table 31 and the information table 32 to select the initial status X'4A' and the type information or TYPE 1, respectively. The local channel control device 2 sends the initial status X'4A' to the host channel, which, in turn, responds to the X'4A' status to disconnect the local channel control device 2, as shown on the left side of FIG. 6. When the host channel later receives an initial status X'04' (Device end) from the local channel control device 2, the host channel will perform a command retry. The local channel control device 2 sends the READ command, the address X'61' and the type information of TYPE 1 to the remote channel control device 3 with the message ISSINF. During the control unit ISS, the control device 3 sends the READ command and the address X'61' to the control unit 5, which sends back the initial status X'00' to the control device 3, also during the control unit ISS. The message ISSTAT X'00' is sent from the control device 3 to the control device 2. During control unit DTS, the data from the I/O device is read and sent to the remote channel control device 3. When the control device 3 has received the data, it sends the message DTSCMP to the control device 2 followed by the data. The control unit 5 sends the ending status X'08' during the control unit ES to the control device 3, which, in turn, stacks the X'08'. That is, the control device 3 does not accept the X'08' at this time, but reads the X'08', and sends the message ESSTAT to the control device 2.

When the local channel control device 2 receives the data, it sends asynchronous status X'04' to the host channel during the host channel CUIS. It will be noted that the host channel was supplied with the initial status X'4A' during the previous host channel ISS, which prepares the host channel to perform command retry when it receives the X'04' status. The host channel, therefore, responds to the X'04' status by performing command retry, so that it again sends the READ command and the address X'61' to the local channel control device 2. The control device 2 then sends the initial status X'00' to the host channel during the following host channel ISS. The control device 2 now sends the data to the host channel during the host channel DTS, followed by the ending status X'08'. The host channel responds to the X'08' status by sending a response, such as RESET, ACCEPT, CHAINING, to the control device 2, and by then disconnecting the control device 2. The control device 2 sends a response to the control device 3 such as the message ESCOND. If the response of the host channel is ACCEPT, the control device 3 accepts the ending status X'08' which was stacked in the control unit ES. If the response is RESET, the RESET is communicated to the control unit 5 and the unit 5 resets the operation. In the exemplary case, the X'08' status is accepted, and the control unit 5 sends the X'04' status to the control device 3 during the control unit CUIS. The X'04' status is also stacked. The control device 3 sends ASYNDE (X'04') to the control device 2, which sends the X'04' to the host channel during the following host channel CUIS. The host channel sends the response, e.g. ACCEPT, to the control device 2, which, in turn, sends the ASCOND (ACCEPT) to the control device 3, so that the control device 3 can now accept the X'04' which was stacked in the control unit CUIS. The READ operation is now complete.

The control device 2 is connected to the host channel during the first host channel ISS, disconnected until the first host channel CUIS, connected until the host channel ES, disconnected until the second host channel CUIS, and connected during the second host channel CUIS, whereby the host-channel can perform other jobs during the disconnected periods.

The connection between the remote channel control device 3 and the control unit 5 is connected and disconnected as shown in the FIG. 6, whereby the control device 3 can perform jobs from other control units during the disconnected periods.

In the type 1 operation, the control unit 5 sends the status X'08' to the remote channel control device 3 when the control device 5 has passed the data from the I/O device 13 to the remote channel control device 3, and sends the status X'04' to the remote channel control device 3 when the I/O device has informed the control unit 5 of the actual end of the READ operation.

Figure 7:
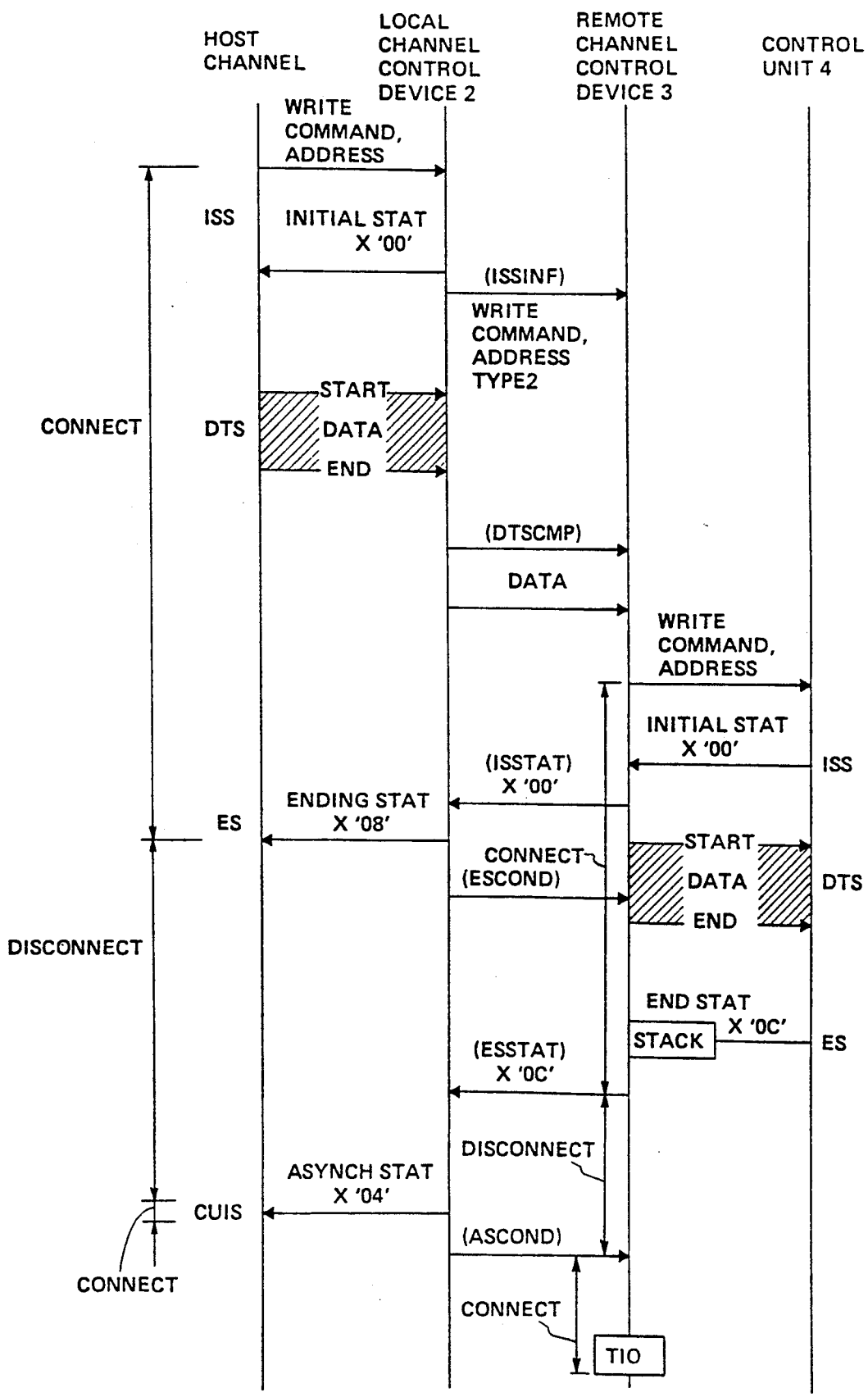

FIG. 7 shows the TYPE 2 WRITE operation wherein the data is written from the host unit 1 to the control unit 4 and the I/O device 12. It will be remembered that control unit 4 has a data buffer memory.

During the host channel ISS, the host channel sends the local channel control device 2 the WRITE command and the address X'62' of the control unit 4. In the same manner as described in the TYPE 1 operations, the WRITE command and the I/O device address X'62' are supplied to the initial status table 31 and the information table 32 to select the initial status X'00' and the type information or TYPE 2, respectively. The local channel control device 2 sends the initial status X'00' to the host channel during the host channel ISS. The local channel control device 2 sends the WRITE command, the address X'62' and the type information or TYPE 2 as the message ISSINF to the remote channel control device 3. During the host channel DTS, the host channel sends the data to the local channel control device 2. When the control device 2 has received the data, it sends the DTSCMP to the control device 3 and sends the data to the control device 3. The control device 3 sends the received WRITE command and the address X'62' to the control unit 4 during the control unit ISS. The control unit 4 then sends the initial status X'00' to the control device 3, which, in turn, sends the X'00' to the control device 2. The control device 2 responds to the X'00' by sending the ending status X'08' to the host channel during the host channel ES. The host channel responds to the X'08' by sending its response, i.e. a signal such as ACCEPT, RESET, etc. on the respective tag line. In this case, it is assumed that the host channel response is ACCEPT. The response, i.e. ESCOND, is sent from the control device 2 to the control device 3. The remote channel control device 3 sends the data to the control unit 4 during the control unit DTS after sending the status X'00' to the control device 2. When the control unit 4 has received the data, it sends the ending status X'0C' to the control device 3 during the control unit ES. The control device 3 stacks the X'0C' and sends the ESSTAT X'0C' to asynchronous status X'04' to the host channel during the host channel CUIS. The host channel responds to the X'04' by sending its response to the control device 2 and by disconnecting the control device 2. The control device 2 sends AS-COND, i.e. the host channel response, to the control device 3. It is assumed that the response at this point is ACCEPT. Thus, at this time the control device 3 accepts the ending status X'0C' received in the control unit ES. The WRITE operation is now complete.

The reasons for stacking the X'0C' are as follows. At the control unit ES, the data has been stored in the control unit 4 or the I/O device. If the X'0C' is accepted by the control device 3 during the control unit ES, the control unit 4 considers that the data transfer in the WRITE operation has been completed without DISCONNECT, RESET, CHAINING etc. Consider, for example, the case where the host channel sends a RESET to clear the stored data at the time that the X'0C' is received. If, when the host channel sends the response RESET to the control unit 4, the X'0C' had already been accepted during the control unit ES, the data stored in the control unit 4 or the I/O device can not be cleared, thus the integrity of the operation would be lost.

In the type 2 operation, the control unit 4 sends the status X'0C' (Channel end and Device end) when the control unit 4 has received the data from the remote channel control device 3 into its data buffer memory. The reason for generating the X'0C' is that the data has been stored in the data buffer memory of the control unit 4 and it is deemed that the I/O device 12 has processed the data.

The host channel connects the local channel control device 2 from the host channel ISS to the host channel ES, disconnects it until the host channel CUIS, and connects it during the host channel CUIS, and can perform other jobs during the disconnected period. The remote channel control device 3 is also disconnected, as shown in the FIG. 7, and can perform jobs of the other control unit during the disconnected period.

Figure 8:
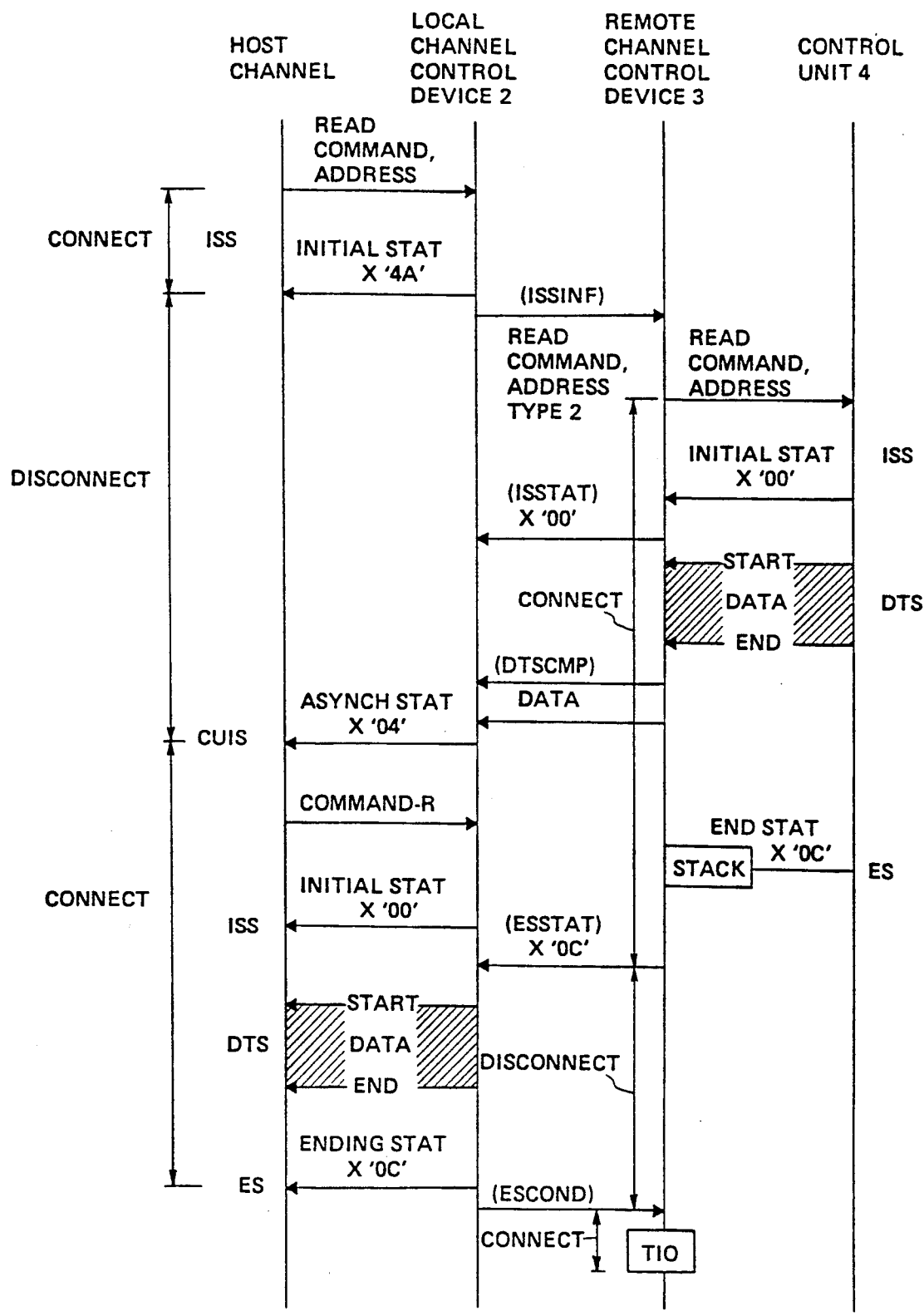

FIG. 8 shows the TYPE 2 READ operation wherein the data is sent from the I/O device 12 and the control unit 4 to the host unit 1. It will be remembered that the control unit 4 has a data buffer memory.

During the host channel ISS, the host channel sends the control device 2 the READ command and the address X'62' of the control unit 4. In the same manner as described in the TYPE 1 operations, the READ command and the address X'62' are supplied to the initial status table 31 and the type information table 32 of the local channel control device 2 to select the initial status X'4A' and the type information or TYPE 2, respectively. The control device 2 sends the X'4A' to the host channel during the host channel ISS, and sends the READ command, the address X'62' and the type information TYPE 2 to the remote channel control device 3 as the message ISSINF. The host channel responds to the X'4A' by disconnecting the control device 2. It will be noted that the X'4A' makes the host channel perform the command retry when the host channel receives the X'04' from the local channel control device 2. The control device 3 sends the READ command and the address X'62' to the control unit 4, which sends back the initial status X'00' to the control device 3 during the control unit ISS. The control device 3 then sends the X'00' to the control device 2 with ISSTAT.

The data is read from the I/O device 12 to the control unit 4 and is sent to the remote channel control device 3 during the control unit DTS. When the control device 3 has received the data, it sends the message DTSCMP to the local channel control device 2. After the DTSCMP, the data is sent from the control device 3 to the control device 2. The control device 2 sends the asynchronous status X'04' to the host channel during the host channel CUIS, which, in turn, responds to the X'04' to start the command retry to re-send the READ command and the address X'62' to the local channel control device 2. The local channel control device 2 then sends back the X'00' to the host channel in the following host channel ISS. The control unit 4 sends the ending status X'0C' to the control device 3 during control unit ES, which, in turn, stacks the status X'0C' and sends the X'0C' to the control device 2 with ESSTAT. The data is sent from the control device 2 to the host channel in the host channel DTS. The control device 2 sends the ending status X'0C' to the host channel during the host channel ES. The host channel sends a signal on the tag line representing its response and disconnects the control device 2. The response, i.e. ESCOND, is sent from the control device 2 to the control device 3. If the response is ACCEPT, the control device 3 accepts, at this time, the ending status X'0C' received in the control unit ES. If the response is RESET, the data is cleared. The READ operation is now complete.

The host channel connects the control device 2 during the first host channel ISS, disconnects until the host channel CUIS, and connects until the host channel ES. The remote channel control device 3 connects and disconnects the control unit 4, as shown in the FIG. 8. During their respective disconnected periods, the host channel can perform other jobs, and the remote channel control device 3 can perform the jobs of other control units.

In the above TYPE 2 operation, the control unit 4 sends the status X'0C' to the remote channel control device 3 when the data in the data buffer memory of the control unit 4 has been sent to the remote channel control device 3.

Figure 9:
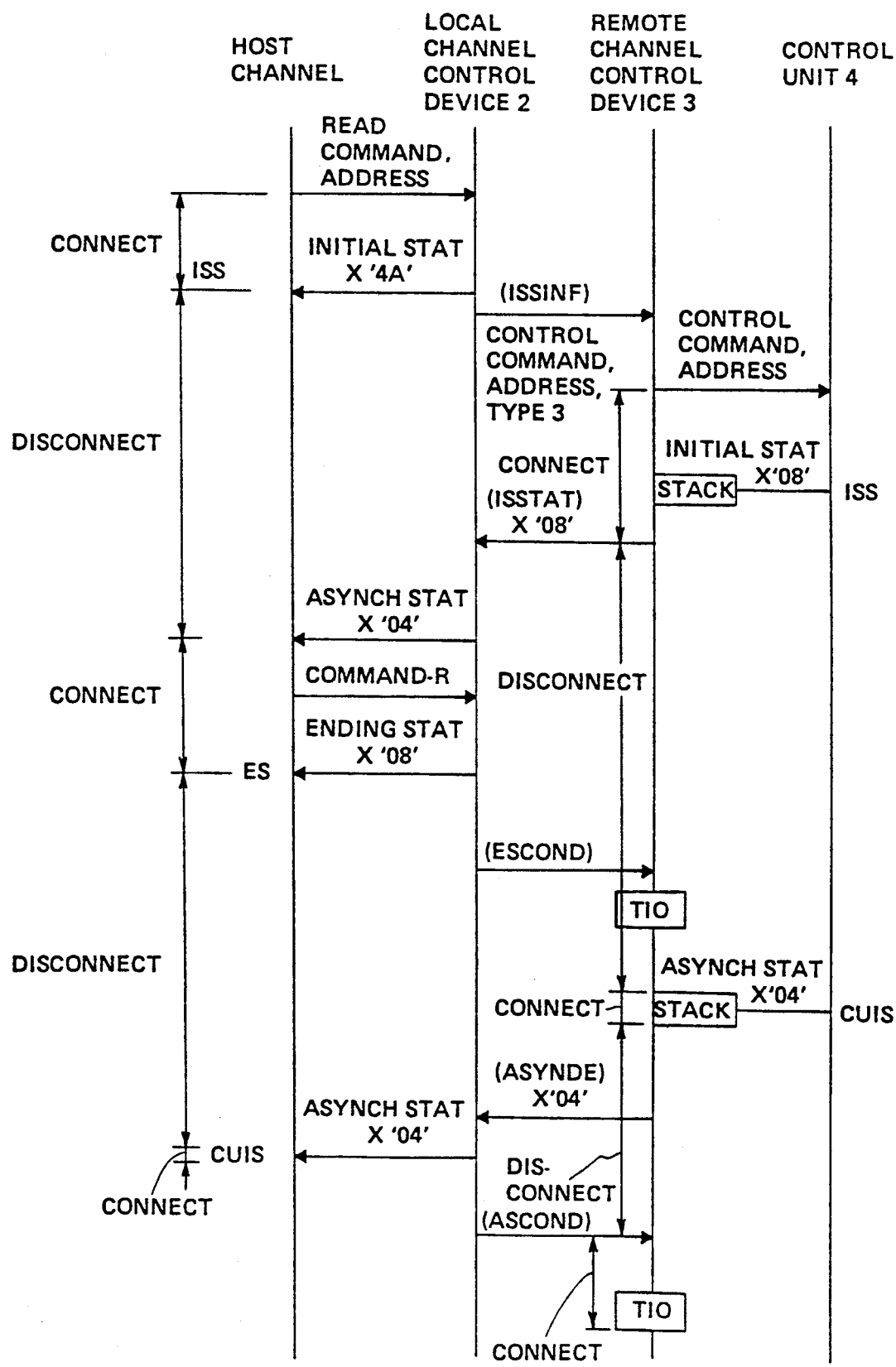
Figure 10:
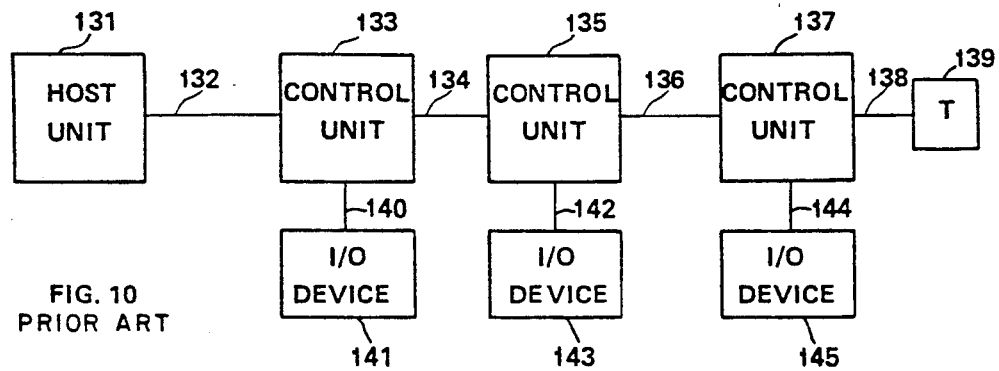
FIGS. 10, 11 and 12 show the configurations of prior data processing systems.
Figure 11:
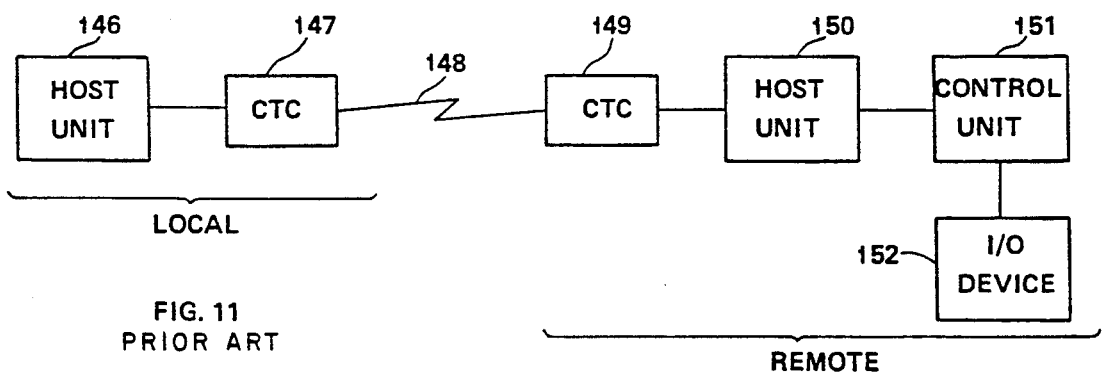
Figure 12:
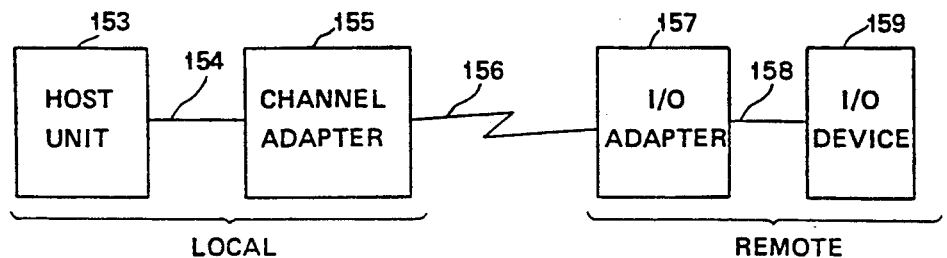

The FIG. 9 shows the TYPE 3 operation wherein a command, such as CONTROL, without the data transfer is processed. The CONTROL command is used to directly control the condition of the I/O device.

The host channel sends the CONTROL command and the address X'62' of the control unit 4, for example, to which the I/O device is connected, to the local channel control device 2 during the host channel ISS. The CONTROL command and the address X'62' are supplied to the initial status table 31 and the type information table 32 to select the initial status X'4A' and the type information TYPE 3. The initial status X'4A' is sent to the host channel during the host channel ISS, which responds to the X'4A' by disconnecting the control device 2. The control device 2 sends the CONTROL command, the address X'62' and the type information TYPE 3 to the control device 3, which sends the CONTROL command and the address X'62' to the control unit 4 during the control unit ISS, which, in turn, sends the initial status X'08' to the control device 3. The control device 3 stacks the X'08', and sends the X'08' to the control device 2 with ISSTAT. The control device 2 sends the asynchronous status X'04' to the host channel, which responds to the X'04' CONTROL command and the address X'62' to the control device 2. The control device 2 then sends the ending status X'08' to the host channel, and the host channel sends its response to the X'08' to the control device and disconnects the control device 2. The control device 2 then sends the host unit response ESCOND to the control device 3. It is assumed the host response is ACCEPT. At this time, the remote channel control device 3 accepts the X'08' stacked during control unit ISS. The control unit 4 sends the asynchronous status X'04' to the second control device, 3, which stacks the X'04', and sends the ASYNDE X'04' to the control device 2, which, in turn, sends the X'04' to the host channel.

The host channel responds to the X'04' by sending its response, e.g. ACCEPT, to the control device 2, and by disconnecting the local channel control device 2. The control device 2 sends the host unit response ASCOND to the control device 3, which, at this time, accepts the X'04' stacked during the control unit CUIS. The operation of the CONTROL command is completed.

The host channel connects and disconnects the local channel control device 2, and the remote channel control device 3 connects and disconnects the control unit 4, as shown in the FIG. 9. The host channel and the remote channel control device 3 can perform other jobs during their respective disconnected periods.

As a modification of the illustrated embodiment, additional plural remote channel control devices can be connected to the remote channel control device 3 in a multi-drop connection.

In accordance with the present invention, the control units are located at the remote location, and the host unit is effectively connected or disconnected to the local channel control device 2 during the execution of the command depending upon the command and the address, whereby the host unit can perform other jobs during the disconnected period.

Having thus described my invention, what I claim as new, and desire to secure by Letters Patent is:

1. In a data processing system transmitting data between a host processor and one of multiple I/O devices, each I/O device controlled by a control unit addressable by an address, an apparatus comprising:

I/O means in the host processor for sending the address of a control unit and a command for controlling the I/O device controlled thereby;

local channel control means connected to the host processor for receiving said address and said command, said local channel control means having look up means for looking up an initial status depending upon the value of said address and said command, first data transmission mean connected between said host and said look up means for transmitting said initial status to said host, and second data transmission means for transmitting said address and said command;

remote channel control means connected to said second data transmission means for receiving therefrom, said address and said command transmitted from said local channel control means, said remote channel control means having means for sending said command to the control unit addressed by said address; and said control unit addressed by said address being connected between said remote channel control means and its I/O device, said control unit for receiving said command from said remote channel control means and for controlling its I/O device in accordance with said command;

said host device further having operation means controlling the connection between said host processor and said local channel control means for controlling connections and disconnections between said host processor and said local channel control means dependent on said initial status for the performance of an I/O operation.

2. The apparatus of claim 1 wherein said look up means includes type means for looking up a type depending upon the value of said address and said command and transmitting said type over said second transmission means to said remote channel control means, and said remote channel control means includes type transmission means for transmitting said type to said control unit along with said command to be used by said control unit during the performance of said I/O operation.

3. The apparatus of claim 2 wherein said look up means includes a microprocessor and a memory, said memory including an initial status table having multiple entries, said initial status table being accessed by addresses and commands, said microprocessor being connected to said memory such that said microprocessor looks up an entry in said initial status table by said address and said command received from said I/O means and returns said entry to said host over said first data transmission means as said initial status.

4. The apparatus of claim 3 wherein said memory also includes a type table having multiple entries, said type table being accessed by addresses and commands, said microprocessor further looking up an entry in said type table by the value of said address and said command received from said I/o means and transmitting said type over said second data transmission means to said remote channel control means for transmission to said control unit.

5. The apparatus of claim 4 wherein said control unit includes a memory having a data buffer for storing data being transmitted between said host processor and said I/O device such that data may be stored therein and retrieved therefrom.

6. The apparatus of claim 1 wherein said first data transmission means includes a parallel bus for transmitting said address, said command, said initial status and said data between said host processor and said local channel control means in a parallel format, said second data transmission means includes a serial bus for transmitting said address, said command said data between said local channel control means and aid remote channel control means in a serial format, and the connection between said remote channel control means and said control unit includes a parallel bus for transmitting said command and said data between said remote channel control means and said control unit in a parallel format.

7. In a data processing system transmitting data from a host processor to an I/O device controlled by a control unit having an address wherein the data is being transmitted in a WRITE operation, an apparatus comprising:

I/O means in said host processor for starting said WRITE operation by transmitting a WRITE command, the address of the control unit of said I/O device, and data;

local channel control means connected to said host processor for receiving said WRITE command, said address and said data transmitted by said I/O means, said local channel control means having look up means for looking up a first command-accepted status and sending said first command-accepted status to said I/O means dependent on the value of said address and the WRITE command, said first command-accepted status for indicating that said WRITE command was received, said remote channel control means further including first transmitting means for transmitting therefrom said WRITE command, said address and said data;

remote channel control means connected to said local channel control means for receiving said WRITE command, said address and said data transmitted from said first transmitting means, said remote channel control means including second transmitting means for transmitting said WRITE command and said data to the control unit identified by said address;

said control unit being connected to said remote channel control means for receiving from said second transmitting means said WRITE command and said data, said control unit further having status means for sending a second command-accepted status to said remote channel control means after the receipt of said WRITE command from said remote channel control means;

said remote channel control means having remote status means for sending a third command-accepted status to said local channel control means after the receipt of said second command-accepted status from said control unit;

said local channel control means having local status means for sending a channel-end status to said host processor after the receipt of said third command-accepted status from said remote channel control means; and disconnect means in said I/O means for disconnecting said local channel control means form said host processor after the receipt of said channel-end status from the local status means of said local channel control means.

8. In a data processing system transmitting data from an I/O device controlled by a control unit having an address to a host processor wherein the data is being transmitted in a READ operation, an apparatus comprising:

I/O means in said host processor for starting said READ operation by transmitting a READ command and the address of the control unit of said I/O device;

local channel control means connected to said host processor for receiving said READ command and said address transmitted by said I/O means, said local channel control means including a look up means for looking up an initial status and sending said initial status to said I/O means dependent on the value of said address and said READ command, said remote channel control means further including first transmitting means for transmitting therefrom said READ command and said address;

said I/O means having disconnect means for disconnecting said local channel control means from said host processor after the receipt of said initial status from said the look-up means of said local channel control means;

remote channel control means connected to said local channel control means for receiving said READ command and said address transmitted from said first transmitting means, said remote channel control means including second transmitting means for transmitting said READ command to the control unit identified by said address;

said control unit being connected to said remote channel control means for receiving from said second transmitting means, said READ command, said control unit also having status means for sending a first command-accepted status to said remote channel control means after the receipt of said READ command from said remote channel control means, and said control unit further being connected to said I/O unit and having means for receiving data from said I/O unit after receiving said READ command from said second transmitting means and for transmitting said data to said remote channel control means;

said remote channel control means having remote status means for sending a second command-accepted status to said local channel control means after the receipt of said first command-accepted status from said control unit, and having means for sending said data from said control unit to said local channel control means; and said local channel control means having local connect means for connecting said local channel control means to said host processor after the receipt of said second command-accepted status from said remote channel control means, and further having data transfer means for transferring said data from said remote channel control means to said host processor after said local connect means has connected said local channel control means to said host processor.

* * * * *